No. 888,092. PATENTED MAY 19, 1908.
P. KESTNER.
DISTRIBUTION OF LIQUIDS IN CENTRIFUGAL FANS OR DRUMS.
APPLICATION FILED AUG. 5, 1907.
2 SHEETS—SHEET 2
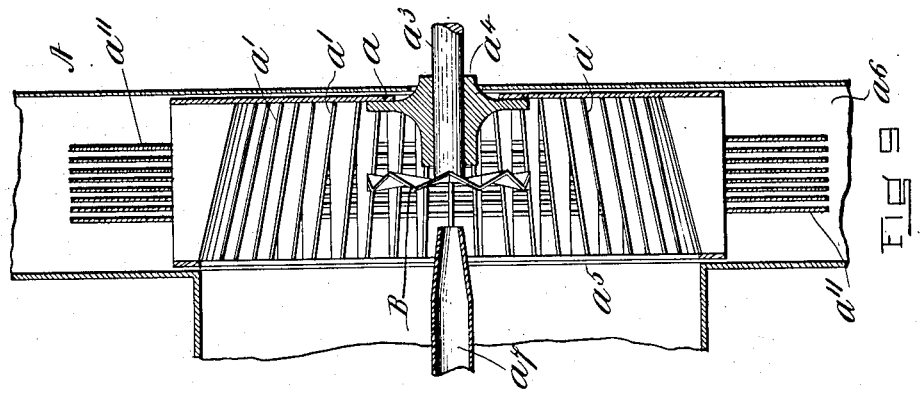
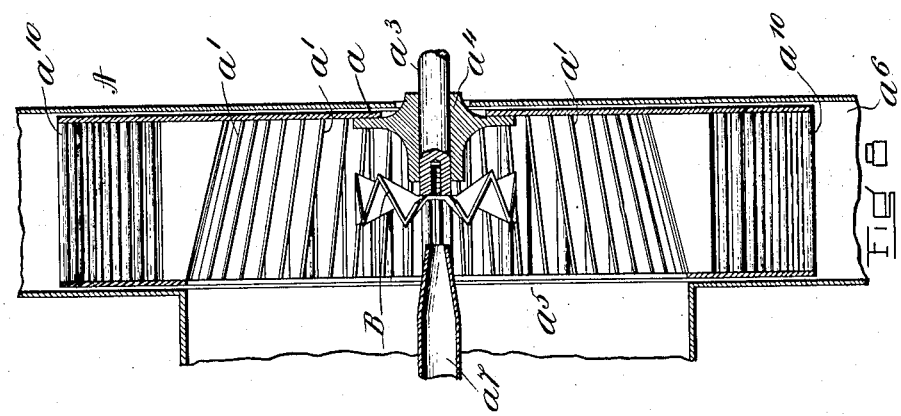
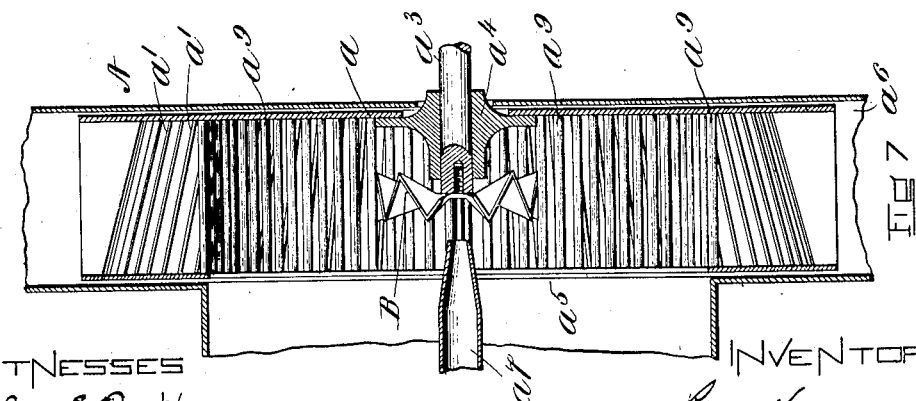
WITNESSES
INVENTOR

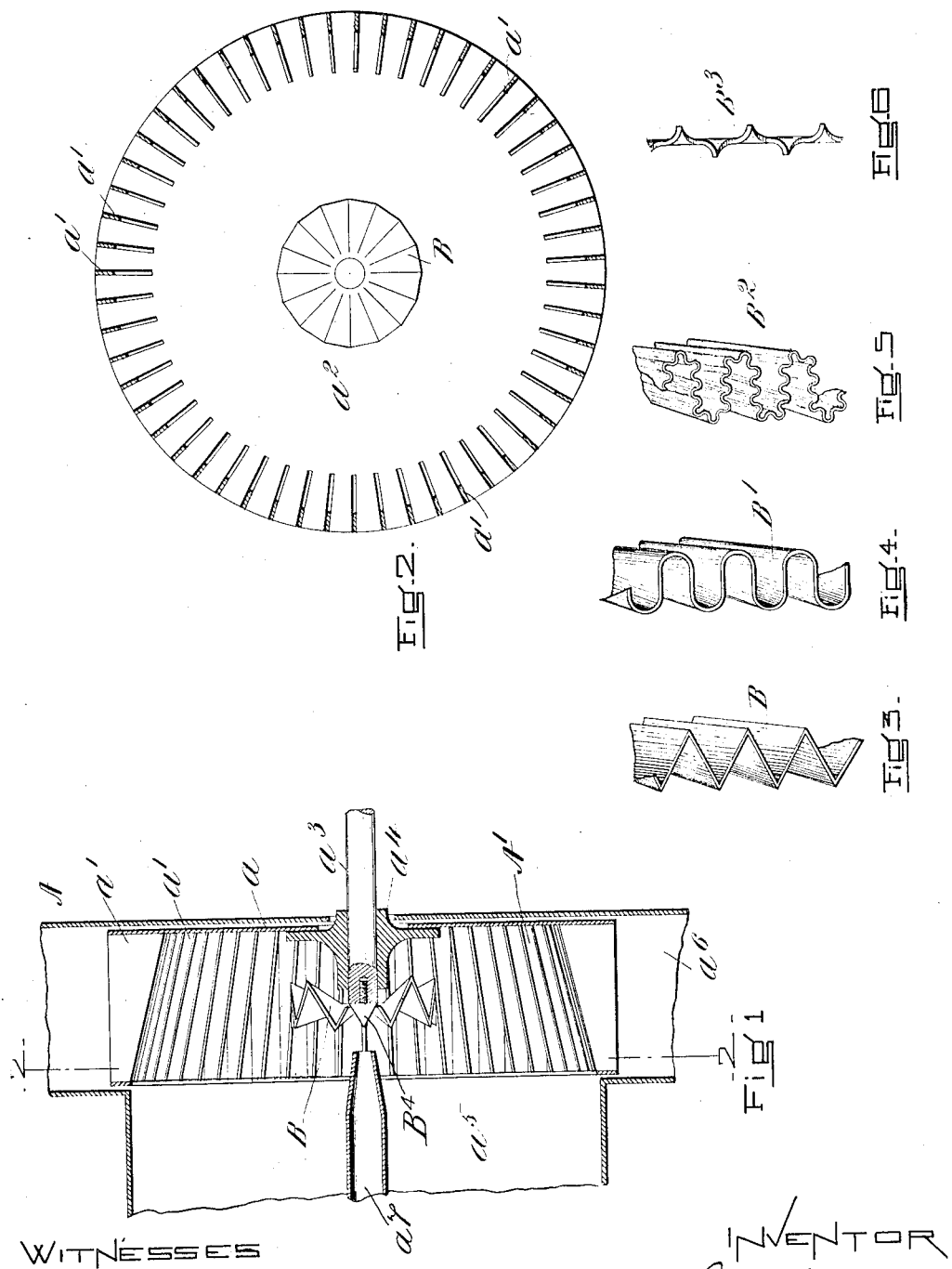

UNITED STATES PATENT OFFICE.

PAUL KESTNER, OF LILLE, FRANCE.

DISTRIBUTION OF LIQUIDS IN CENTRIFUGAL FANS OR DRUMS.

No. 888,092.  Specification of Letters Patent.  Patented May 19, 1908.

Application filed August 5, 1907. Serial No. 387,076.

*To all whom it may concern:*

Be it known that I, PAUL KESTNER, of Lille, France, a citizen of the Republic of France, have invented a new and useful Improvement in the Distribution of Liquids in Centrifugal Fans or Drums, of which the following is a full, clear, and exact description, reference being had to the accompanying drawings, forming a part of this specification, in explaining its nature.

My invention relates to means for obtaining the distribution of liquids in centrifugal fans or drums.

In order to fully understand my invention attention will be called to the fact that centrifugal fans or drums have been used by me for atomizing liquids and this for the purpose either of forming humidified air as described in my co-pending application entitled "Means for humidifying the air of rooms", filed July 29, 1904, Serial No. 218,701, or for the purpose of intimately mixing a liquid with gases agitated by the fan or drum for washing these gases. See in this connection my co-pending application entitled "Process of washing gases", filed May 4, 1906, Serial No. 315,263, or for the purpose of effecting absorption of gases by liquid or for other purposes. In my pending application filed October 10, 1906, Serial No. 338,224, I have described an atomizing drum especially designed to be used for atomizing liquids.

I have proved by experiments that, whether my improved atomizing drum or an ordinary centrifugal fan wheel be employed, atomization is effected at the extreme outer edge of each blade or wing, and, further, that the efficiency of the apparatus, as regards quantity of liquid atomized as well as completeness of atomization, is very largely dependent on the regular and even distribution over and along the inner edges of the wings or blades of the liquid to be atomized. It is this regular distribution of the liquid over and along the inner edges of the wings or blades which constitutes the main difficulty in getting an apparatus to work with great efficiency. I have actually demonstrated that each blade or wing will effect the atomization or breaking up into very fine particles, of only a limited quantity of liquid, even when the liquid is distributed perfectly regularly along the blade. When this quantity is exceeded the edge of the blade is "drowned" and no atomization in the proper sense is effected but the liquid is thrown off in comparatively large drops. If the liquid is not spread or distributed regularly or evenly along the blades, parts of the edges thereof will be more or less drowned by having a greater excess of liquid supplied to them than they can atomize whereas other parts will have a less quantity of liquid than they might atomize. It will, therefore, be evident that in order to enable the best results to be attained not only must the total quantity of liquid supplied to the rotating wheel be regulated according to the dimensions of the wheel but the liquid must be so distributed that each blade receives its proper share and also that that share is evenly spread along the blade.

Multiple jets have been tried, and also full circular jets, but by neither is the result desired attained. Whatever be the division into multiple jets there are always "drowned" edges at the points where the jets strike the blade and it is in practice almost impossible to so distribute the jets that even the quantity of liquid supplied to each of the blades is equal. As to full circular jets, they meet one aspect of the problem, in that all blades or wings of the fan or drum can be made to receive the same quantity of water, but on the other hand the even distribution along the whole of the width of each blade is not attained and the results are always very imperfect.

By means of my invention the defects referred to are entirely obviated as by its means each blade receives, firstly, its proper share of the total quantity of liquid supplied to the drum or fan wheel and, secondly, the liquid is perfectly evenly distributed along the whole blade so that the atomizing edges act at every point on a uniform quantity of liquid. A centrifugal fan or drum can thus be supplied with a maximum quantity of liquid all of which will be atomized to the desired degree of fineness.

The various embodiments of my invention can best be seen and understood by reference to the drawings, in which—

Figure 1 shows in cross section a centrifugal fan fitted with a liquid distributing disk embodying my invention. Fig. 2 shows a cross section on the line 2—2 of Fig. 1. Fig. 3 shows in enlarged detail a portion of the distributing disk shown in Fig. 1. Figs. 4, 5 and 6 show other forms of liquid distributing disks embodying my invention, and to these special reference will hereinafter be made. In Figs. 7, 8 and 9 there are shown in cross section fans having still further embodiments of my invention.

In the drawings:—A represents a casing. Inside this is a rotary fan or atomizing drum $A^1$ comprising a disk $a$ from which there project a large number of blades $a^1$ extending in a direction substantially parallel with the axis of the fan around its interior chamber $a^2$. The fan is driven by means of the shaft $a^3$ extending through the wall of the casing and connecting with the hub $a^4$ on the disk $a$. The shaft $a^3$ may be driven in any suitable manner. $a^5$ is the opening into the chamber of the fan for the ingress of liquid and gas and $a^6$ is the outlet from the fan casing.

On the hub of the fan or rather the end of the driving shaft $a^3$, connecting therewith by any suitable connection, is the distributer B. This distributer is in the form of a corrugated disk preferably made of metal, bent to undulate outwardly in the direction of its periphery. Accordingly it has somewhat the form of a circular folding fan when open. The position of the distributing disk B is preferably such that its location will be at about the center of the fan and directly in front of the inlet pipe $a^7$ which discharges liquid into the center of the disk with the effect that as the fan is rotated the rotation of the disk will cause the liquid discharged into the center thereof to flow or spread outwardly over its entire surface and be centrifugally expelled from the outer edges or periphery of the disk onto the blades of the fan. The depth of the corrugations of the disk determines the angle of its projection so that the liquid may be discharged at an angle commensurate with the width of the blades of the fan or other atomizing means onto which the distribution of the liquid is made.

The form of the distributer may, of course, vary. In Fig. 3 the corrugations in the distributer are obtained by acutely bending it. In Fig. 4 a distributing disk $B^1$ is shown in which the corrugations are rounded off. $B^2$ in Fig. 5 shows an edge view of a distributer disk similar to the preceding but having in addition upon the whole of its surface smaller corrugations. In Fig. 6 $B^3$ shows an edge view of a disk suitable to be used when the liquid is not required to be spread out much: this is practically simply a circular saw the set of the teeth of which is more pronounced than in a saw.

Other forms of distributer may, of course, be employed and still be within the scope of my invention.

In connection with this mode of distribution obtained by the centrifugal expulsion of the liquid from the distributer, it is to be especially noted that the liquid instead of being expelled from the distributer in a sheet on to the blades of the atomizing fan, is projected thereon in drops. In other words, the blades of the fan are evenly sprinkled with a comparatively fine spray of liquid which assists materially in obtaining thereon a proper thin film of liquid to be atomized, as was before explained.

The regularity of the sprinkling may be still further secured by an arrangement like that shown in Fig. 7. In this figure as in the subsequent figures it is to be observed that the ends of the blades of the fan are attached to an annular plate $a^8$ between which and the disk $a$ the blades are interposed. Likewise interposed between the disk $a$ and plate $a^8$ and at a position intermediate of the blades of the fan and the distributing disk B are a series of bars or wires $a^9$ arranged preferably closely adjacent to each other. These bars or wires receive the liquid projected by the inner distributer disk, which strikes the bars or wires and is more equally spread and to some extent distributed or disseminated in finer particles than those thrown from the distributing disk inasmuch as the peripheral speed of the bars or wires is greater than that of the disk. From the bars or wires $a^9$ the liquid is centrifugally projected on to the blades of the fan, whereby the blades by the regularity of the application of the liquid become covered with such a fine film as will enable them to very effectively perform the operation of atomization.

In Fig. 8 an arrangement is shown in which a drum composed of wires $a^{10}$ are arranged in the fan outside the blades $a^1$, the blades being arranged slightly nearer the center of the fan than in Fig. 7. With this construction the blades first receive the liquid thrown from the distributing disk B and in addition to propelling the air or gas they act as secondary diffusers or distributers to throw the liquid against the wires beyond them whereby the atomization will be effected with exceeding fineness. In this construction of apparatus the blades or wings draw in air or gas and at the same time diffuse the liquid projected upon them by the inner distributer. They serve to project the liquid regularly upon the atomizing wires $a^{10}$ and at the same time they displace a large volume of air. This apparatus absorbs much less power than that previously described in view of the fact that the blades $a$ which cause the displacement of the air or gas are not so far away from the center and consequently move at a less speed than the atomizing wires $a^{10}$ which must rotate at a very high speed.

In Fig. 9 I have shown an apparatus in which the blades which propel air or gas and diffuse the liquid are surmounted by a series of atomizing rings $a^{11}$. The rings may be placed along the entire width of the fan wheel or rather blades thereof, but I prefer, as shown, to place them only along a portion thereof. For this type of apparatus I use an inner distributer which will act to project the liquid only upon that portion of the blades whereon the atomizing rings are carried. The effect is that the blades of the fan receiving the liquid act to distribute it upon the atomizing rings, which effect the complete atomization of the liquid. At the same time the blades of the fan are acting to displace a great amount of air or gas, which not only assists in the atomization of the liquid but in the development of strong currents, especially in those portions of the fan blades which receive no liquid, which acts to carry the finely atomized liquid, which feature is important especially where it is desired to carry the atomized liquid some considerable distance through pipes.

As already stated I do not confine my invention to the particular forms of distributer illustrated, as such forms, it will be readily understood, may be varied without departing from the spirit of my invention. In the drawings it will be seen that in every instance the peripheral edge of the distributer is offset or undulated. In the forms illustrated in Figs. 3, 4 and 5 this offset or undulation is attained by corrugating the disk in a radial or substantially radial direction whereas in the form illustrated in Fig. 6 the offset or undulation is attained by serrating the peripheral edge of the disk and then bending the tongues or teeth thereby formed to the desired extent. The essential characteristic of each distributer being that the liquid delivered against it will by centrifugal force be thrown off and the form of the distributer such that said liquid is thrown off in a gradually expanding field of fine drops whereby the whole liquid is evenly spread upon the atomizing blades or wires or first against a secondary distributer or diffuser formed of wires or blades.

In order to insure the liquid spreading properly and evenly on the distributer and to prevent any of the liquid splashing off I preferably attach the distributer to the shaft $a^3$ by a screw or bolt having a projecting head $B^4$ (as shown in Fig. 1) of conical shape and arrange the nozzle $a^7$ so that the liquid is projected centrally on the said conical head, the said cone serving to more or less gradually change the direction of movement of the liquid from that in which it is projected towards the distributer to that in which it is eventually thrown off from the distributer.

Having thus fully described my invention, I claim and desire to secure by Letters Patent of the United States:—

1. The combination with a rotary atomizer having a series of blades surrounding an interior chamber, of a distributer contained within said chamber, and means for directing a stream of liquid into said distributer to be diffused thereby on to said blades of the atomizer by the force of centrifugal expulsion.

2. The combination with a rotary atomizer having a series of atomizing blades surrounding an interior chamber, of a distributer comprising an undulated disk, means for locating said distributer inside said atomizer to rotate therewith, and means for directing a stream of liquid on to said distributer to be diffused thereby on to said blades by the force of centrifugal expulsion.

3. The combination with a rotary atomizer having atomizing blades surrounding an interior chamber, of means for spraying said blades with liquid dispersed into a fine spray by the force of centrifugal expulsion.

4. The combination with a rotary atomizing means of a series of blades concentrically arranged inside said means for dispersing liquid thereon by the force of centrifugal expulsion, and means for throwing liquid on to said blades.

5. The combination with a rotary atomizer for atomizing liquid of a rotary distributer located centrally within the atomizer and the peripheral edge of which is offset or undulated, and means for directing a stream of liquid onto said distributer to be diffused thereby onto said atomizer by centrifugal action.

6. The combination with a rotary atomizer having a series of blades or wings surrounding an interior chamber, of a distributer contained within said chamber and the peripheral edge of which is offset or undulated, and means for directing a stream of liquid onto said distributer to be diffused thereby onto said blades or wings of the atomizer by centrifugal action.

7. The combination with an atomizer comprising a series of atomizing and air propelling blades, of a secondary atomizer, said atomizers being arranged whereby one may act as a distributer to the other for dispersing liquids thereon, and means for supplying liquids to the liquid-distributing atomizer.

8. The combination with a series of rotary disks parallelly arranged, of propelling blades or wings arranged inside said disks for distributing liquid thereon by the force of centrifugal expulsion, and means for throwing liquid onto said blades.

9. The combination with a rotary atomizer surrounding an interior chamber, of a distributer located centrally within said chamber a secondary distributer in the form of a drum made of blades or wings and located between said distributer and the said rotary atomizer, and means for directing a stream of liquid onto said distributer to be diffused thereby onto the secondary distributer and then again spread or diffused by the secondary distributer onto the atomizer by centrifugal action.

10. The combination with a rotary atomizer for atomizing liquid, of a rotary distributer located centrally within the atomizer and the peripheral edge of which is offset or undulated, a cone at the center of the distributer, and means for directing a stream of liquid centrally on the cone of said distributer to be diffused by the latter onto said atomizer by centrifugal action.

PAUL KESTNER.

In presence of—
CHARRIER, HENRI,
LÉON PECKEL.